US 6,873,593 B1

(12) United States Patent
Pavel

(10) Patent No.: US 6,873,593 B1
(45) Date of Patent: Mar. 29, 2005

(54) THREE-DIMENSIONAL OPTICAL MEMORY WITH FLUORESCENT PHOTOSENSITIVE VITREOUS MATERIAL READ AND WRITTEN TO BY LASER

(76) Inventor: Eugen Pavel, Calea Mosilor 274, APT. 34, R-73252 Bucharest (RO)

( * ) Notice: Subject to any disclaimer, the term of this patent is extended or adjusted under 35 U.S.C. 154(b) by 0 days.

(21) Appl. No.: 09/424,272
(22) PCT Filed: May 20, 1998
(86) PCT No.: PCT/RO98/00006
  § 371 (c)(1),
  (2), (4) Date: Nov. 18, 1999
(87) PCT Pub. No.: WO98/53448
  PCT Pub. Date: Nov. 26, 1998

(30) Foreign Application Priority Data
May 21, 1997 (RO) ............................................. 97-00928

(51) Int. Cl.[7] .............................. C03C 4/04; G11B 7/00
(52) U.S. Cl. ............................ 369/121; 501/40; 501/50; 501/64; 252/301.4
(58) Field of Search ............................ 369/121, 112.23, 369/108; 501/40, 50, 64, 3, 78; 252/301.4

(56) References Cited

U.S. PATENT DOCUMENTS

| | | | | |
|---|---|---|---|---|
| 3,694,627 A | * | 9/1972 | Blatchford et al. | ......... 219/543 |
| 3,984,591 A | * | 10/1976 | Plumat et al. | .............. 427/165 |
| 4,129,434 A | * | 12/1978 | Plumat et al. | ............. 65/60.52 |
| 4,297,417 A | * | 10/1981 | Wu | ............................. 428/410 |
| 4,703,019 A | * | 10/1987 | Abe et al. | ...................... 501/13 |
| 5,034,613 A | * | 7/1991 | Denk et al. | .............. 250/458.1 |
| 5,216,664 A | * | 6/1993 | Sleegers et al. | ............ 369/278 |
| 5,325,324 A | | 6/1994 | Rentzepis et al. | |
| 5,874,214 A | * | 2/1999 | Nova et al. | ..................... 435/6 |
| 5,912,257 A | * | 6/1999 | Prasad et al. | ............... 514/356 |
| 5,955,388 A | * | 9/1999 | Dejneka | ........................ 501/3 |
| 6,020,591 A | * | 2/2000 | Harter et al. | ............ 250/458.1 |
| 6,132,643 A | * | 10/2000 | Pavel | .................. 252/301.4 R |

FOREIGN PATENT DOCUMENTS

WO   WO 91/07651   5/1991

\* cited by examiner

Primary Examiner—Gautam R. Patel
(74) Attorney, Agent, or Firm—Herbert Dubno

(57) ABSTRACT

A three-dimensional vertical memory with florescent photosensitive vitreous material is read and written to by a laser or respective lasers. The memory can be cerium and europium-doped fluorescent photosensitive glass, yttrium, europium and praseodymium-containing glass or TV-doped glass, etc. A confocal microscope may be used in the writing process and the memory may be scanned by rotating it.

4 Claims, 2 Drawing Sheets

THREE-DIMENSIONAL OPTICAL MEMORY WITH FLUORESCENT PHOTOSENSITIVE VITREOUS MATERIAL READ AND WRITTEN TO BY LASER

CROSS-REFERENCE TO RELATED APPLICATIONS

This application is a national stage of PCT/RO98/00006 filed May 20, 1998 and is based upon Romanian national application 97-00928 of 21 May 1997 under the International Convention.

TECHNICAL FIELD

The present invention relates to a three-dimensional optical memory with fluorescent photosensitive materials and more particularly to a method and device for storage and retrieval digital data, using fluorescence phenomenon. The device presented in the invention is a WORM type storage system (write-once-read-many).

BACKGROUND OF THE INVENTION

It is known that the growing of computer applications has imposed the necessity for memories with huge storage capacity needed for libraries, government agencies, hospitals, etc. The new memories should have the following characteristics: low-cost, small size and low energy consumption.

Present memory technologies, such as semiconductor memories, CD-ROMs, rigid and flexible magnetic disks, and magnetic tape store information on a two-dimensional support. Due to their 2-D nature, these memories are not able to provide parallel access, and their access time grows with increasing capacity.

A solution is the use of the third dimension. Three-dimensional optical memories have higher theoretical storage capacity than present 2-D memories.

For example, the maximum theoretical storage density for an optical disk is $1/\lambda^2 = 3.5 \times 10^8 \text{bits/cm}^2$, while for a 3-D memory $1/\lambda^3 = 6.5 \times 10^{12} \text{bits/cm}^3$ assuming that the same wavelength of light $\lambda = 500$ nm is used to access the information. In addition, 3-D optical memory have the potential for parallel access, because an entire plane can be read or written in a single operation. 3-D data storage was experimented on holographic memories made by photorefractive materials (D. Psaltis and F. Mok, *Scientific American*, November 1995, p.52).

SUMMARY OF THE INVENTION

It is the object of the present invention to employ the fluorescence phenomenon to provide a WORM type 3-D optical memory. Since the read cycle uses fluorescence rather than changes in absorption a higher sensibility is obtained.

The invention is based on writing and reading the information in fluorescent photosensitive materials namely fluorescent photosensitive glass (Romanian Patent Application No. 97-00005, Jan. 6, 1997) and a fluorescent photosensitive vitroceramic (Romanian Patent Applications No. 97-000233, Feb. 4, 1997 and No. 97-00761, Apr. 21, 1997) created by the author of present invention. Writing and reading of said data are carried out with a confocal microscope. The confocal principle was invented by Marvin Minsky. A point light source is imaged in the object plane. The emitted fluorescent light is directed to a photomultiplier through a detector pinhole. The pinhole is a spatial filter, which permits the analysing of the light issued only from the focal plane containing this object. This fact ensures obtaining an improved spatial resolution. A computer displays the point as a pixel on a screen. In order to produce a complete image, the light point is moved over the entire object. The arrangement of the detector pinhole, conjugated to the illumination pinhole, ensures that only information from the focal plane reaches the detector. The confocal principle is especially valuable in fluorescence microscopy, since it almost completely eliminates stray light not coming from focal plane.

Thus the system is able to produce fluorescence images with optimum clarity and resolution of fine details. Confocal system LEICA TCS NT achieves an x-/y-resolution of $0.18\mu$ (FWHM) and a corresponding z-resolution of better than $0.35\mu$ (FWHM) at $\lambda = 488$ nm and N.A.=1.32. The analyzed volume of the sample is under 1 $\mu\text{m}^3$. An improvement of the fluorescence microscopy has been obtained with two-photon process which is used for the excitation of fluorescent photosensitive material. The two-photon microscopy is a non-linear technique that provides intrinsic three-dimensional resolution with negligible out-of-focus photoexcitation. A similar result is obtained if the excitation beam is perpendicular to the fluorescence beam. The writing process consists of the irradiation of fluorescent photosensitive material with a radiation producing a fluorescence extinction in the irradiated areas. The reading is obtained by the excitation of material. Non-irradiated areas have a strong fluorescence.

Invention presents the advantage of a novel device for storage and retrieval data having application in computers.

DISCLOSURE OF THE INVENTION

The invention is further illustrated by four examples which disclose the characteristic features of the invention.

The objects, features and advantages of the invention will become clear from the following description set forth below, in conjunction with the drawings, in which.

Figure 1:
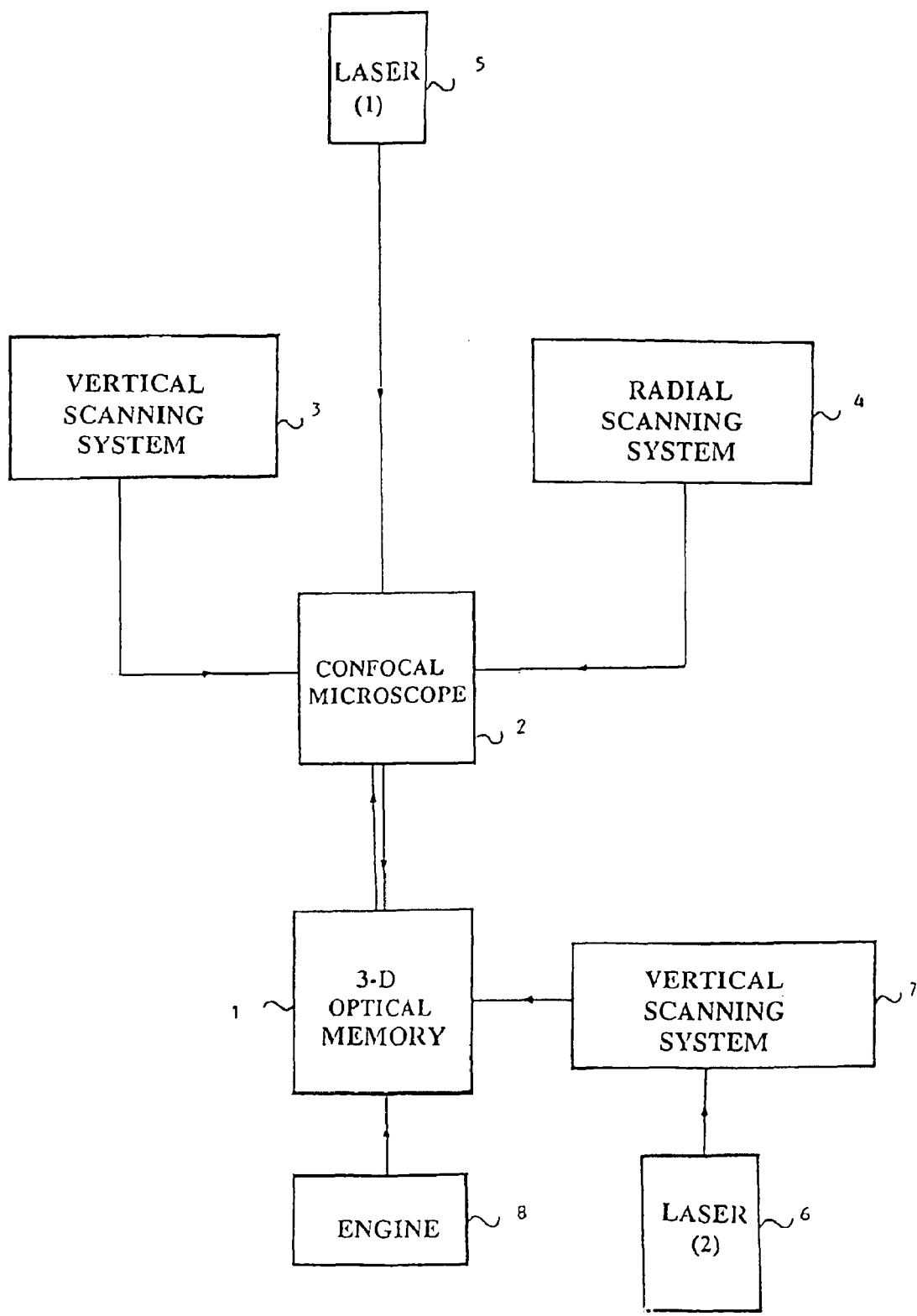
FIG. 1 is a block diagram for the writing/reading device.

Referring to FIG. 1 an optical system for recording and reading data on optical memory 1 is shown. The experimental system includes: a confocal microscope 2, vertical scanning systems 3, 7, a radial scanning system 4, a laser (1) 5, laser (2) 6 and an engine 8 used for rotation of the optical memory 1. The writing process consists in the irradiation of a selected volume of memory 1 with a light beam of the laser (1). The volume selection is carried out with said confocal microscope 2, vertical scanning system 3 and radial scanning system 4. The irradiated volume of fluorescent photosensitive material suffers a transition (at electronic level for fluorescent photosensitive glass and at structural level for fluorescent photosensitive vitroceramic) which produces tile fluorescence extinction. Two procedures could be used for reading. One of these procedures produces the excitation with one-photon process. Laser (2) and vertical scanning system 7 are used in the optical system. The second procedure, which is based on said two-photon process, directs the beam of laser (1) to the specimen.

Figure 2:
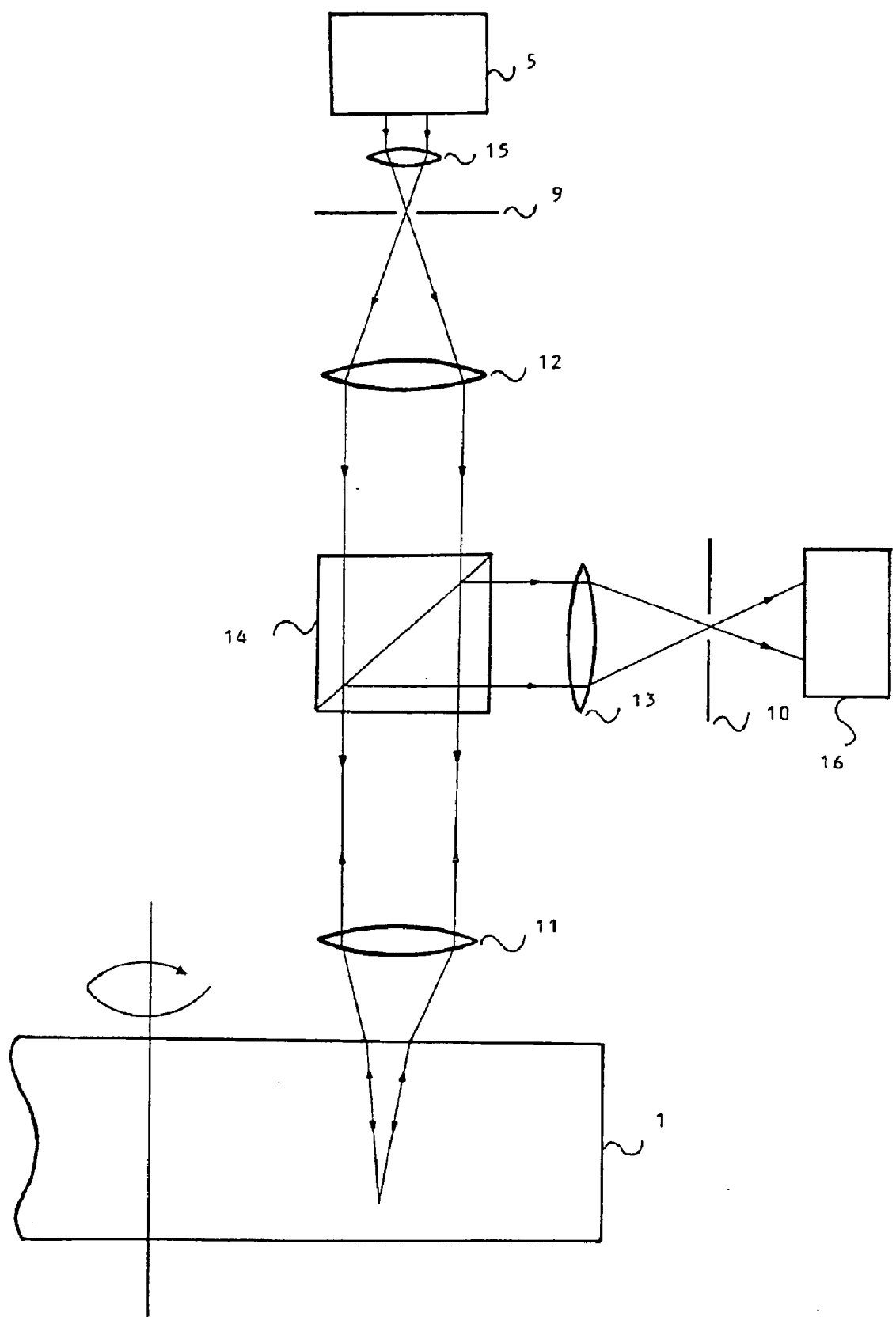
FIG. 2 is a diagrammatic view of the confocal microscope.

The confocal microscope (FIG. 2) used in writing processes has the following elements: two pinholes 9, 10, the lens 11, 12, 13, 15, the beam-splitter 14, the laser 5 and the detector 16.

The present invention will be illustrated in greater details by the following examples, but the merits thereof are not intended to be limited by the materials, compositions and procedures described in these examples.

Example 1: A Ce, Eu doped fluorescent photosensitive glass is used as a support for the optical memory namely: $Na_2O$—$P_2O_5$-0.005 $CeO_2$-0.005 $Eu_2O_3$.
Memory writing is carried out with said laser (1) (XeCl laser) at $\lambda_1$=308 nm and the memory reading is based on said laser (2) Nd:YAG laser with $\lambda_2$=532 nm.

Example 2: A fluorescent photosensitive glass is the support of optical memory as a variant of Example 1: $2Na_2O$-$(Y_{0.94}Eu_{0.05}Pr_{0.01})_2O_3$-$5P_2O_3$ The writing process uses a two-photon absorption of laser light. The recording is carried out by a tunable Ti:sapphire laser (1) at $\lambda_1$=720 nm with 100 fs laser pulses. A Nd:YAG laser (2) at $\lambda_2$=532 nm excites the fluorescent material for said reading process.

Example 3: A Tb doped fluorescent photosensitive vitroceramic is used for the optical memory (wt %), namely: ~$30SiO_2$-$45PbF_2$-$14Al_2O_3$-$10YF_3$-$1TbF_3$-$0.05Sb_2O_3$-$0.01$ Ag
The recording and reading are based on the two-photon processes. A tunable Ti:sapphire laser(1) with 100 fs laser pulses writes at $\lambda_1$=720 nm and reads at $\lambda_2$=750 nm.

Example 4: A similar fluorescent photosensitive vitroceramic as in Example 3 is used for the optical memory (wt %), namely:
~$69SiO_2$-$15.3Na_2O$-$5ZnO$-$7Al_2O_3$-$0.25Tb_4O_7$-$0.25CeO_2$-$0.2Sb_2O_3$-$0.01Ag$-$2.3F^-$-$0.7Br^-$. The writing is carried out with a tunable Ti: sapphire laser (1) with 100 fs laser pulses using $\lambda_1$=720 nm while for reading is used $\lambda_2$=980 µnm.

What is clamed is:

1. A data storage and retrieval system comprising:
   an optical memory constituted as a vitreous fluorescent photosensitive body selected from the group which consists of fluorescent photosensitive glass and fluorescent photosensitive vitreous ceramic constituting an information recording medium; and
   at least one laser for directing a beam at said memory and adapted to read stored information from and write information to be stored to said memory.
2. The system defined in claim 1 wherein said memory is composed of a fluorescent photosensitive glass.
3. The system defined in claim 1 wherein said memory is composed of a fluorescent photosensitive vitroceramic.
4. The system defined in claim 1 which comprises a confocal microscope;
   a tunable laser having light pulses at a rate of a maximum of 100 fs for reading and writing from and to said memory through said confocal microscope;
   a vertical scanning system and a radial scanning system for the movement or writing and excitation beams over said memory;
   an engine for rotating said memory; and
   an excitation laser having a beam perpendicular to a fluorescent beam from said memory and provided with a vertical scanner for reading said memory by a one-photon process.

* * * * *